(12) United States Patent
Paz et al.

(10) Patent No.: US 12,166,702 B2
(45) Date of Patent: Dec. 10, 2024

(54) PHASE TRACKING REFERENCE SIGNAL PILOT ALLOCATION SIZES

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/448,851

(22) Filed: Sep. 24, 2021

(65) Prior Publication Data
US 2023/0099883 A1    Mar. 30, 2023

(51) Int. Cl.
| | |
|---|---|
| *H04W 24/08* | (2009.01) |
| *H04L 1/00* | (2006.01) |
| *H04L 5/00* | (2006.01) |
| *H04L 43/0805* | (2022.01) |

(52) U.S. Cl.
CPC .......... *H04L 5/0039* (2013.01); *H04L 1/0003* (2013.01); *H04L 5/0048* (2013.01); *H04L 5/006* (2013.01)

(58) Field of Classification Search
CPC ... H04L 5/0039; H04L 1/0003; H04L 5/0048; H04L 5/006
See application file for complete search history.

(56) References Cited

U.S. PATENT DOCUMENTS

| | | | |
|---|---|---|---|
| 8,559,546 B2 * | 10/2013 | Leyonhjelm | H04L 27/2659 375/276 |
| 10,404,340 B2 | 9/2019 | Manolakos et al. | |
| 2004/0247137 A1 * | 12/2004 | Inoue | G10K 11/17854 381/71.4 |
| 2006/0073790 A1 * | 4/2006 | Kent | H04B 7/0857 455/67.11 |
| 2007/0070944 A1 | 3/2007 | Rinne et al. | |
| 2008/0219236 A1 * | 9/2008 | Love | H04L 5/0007 370/347 |
| 2010/0177723 A1 * | 7/2010 | Kim | H04L 5/0048 370/329 |
| 2011/0255584 A1 * | 10/2011 | Dateki | H04W 72/21 375/224 |
| 2012/0120907 A1 * | 5/2012 | Kishigami | H04L 5/0051 370/329 |

(Continued)

FOREIGN PATENT DOCUMENTS

| | | |
|---|---|---|
| CN | 102414987 B | 8/2016 |
| CN | 103999379 B | 6/2017 |

(Continued)

*Primary Examiner* — Atique Ahmed
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit an indication associated with phase noise characteristics of the UE. The UE may receive an indication of pilot allocation sizes, for different data modulation and coding schemes (MCSs) for communications, of frequency-domain contiguous pilots for phase noise mitigation based at least in part on the indication associated with the phase noise characteristics of the UE. Numerous other aspects are described.

30 Claims, 11 Drawing Sheets

(56) References Cited

U.S. PATENT DOCUMENTS

| | | | |
|---|---|---|---|
| 2012/0263117 A1* | 10/2012 | Love | H04W 72/23 370/328 |
| 2013/0100911 A1* | 4/2013 | Lv | H04W 72/21 370/329 |
| 2013/0128932 A1* | 5/2013 | Huang | H04L 27/2613 455/73 |
| 2014/0177762 A1* | 6/2014 | Gotman | H04L 1/0086 375/340 |
| 2014/0269362 A1* | 9/2014 | Azizi | H04W 24/06 370/252 |
| 2014/0286246 A1 | 9/2014 | Bao et al. | |
| 2015/0036631 A1* | 2/2015 | Yang | H04L 5/0048 370/329 |
| 2015/0098535 A1 | 4/2015 | Wu et al. | |
| 2016/0143011 A1* | 5/2016 | Xia | H04B 7/0456 370/330 |
| 2017/0294926 A1* | 10/2017 | Islam | H04B 1/1027 |
| 2018/0109366 A1 | 4/2018 | Wu et al. | |
| 2018/0308469 A1* | 10/2018 | Sugai | G10K 11/17813 |
| 2018/0365975 A1* | 12/2018 | Xu | H04B 7/0626 |
| 2019/0013914 A1* | 1/2019 | Xu | H04L 25/0222 |
| 2019/0036666 A1 | 1/2019 | Li et al. | |
| 2019/0132247 A1 | 5/2019 | Zhang et al. | |
| 2020/0008228 A1 | 1/2020 | Lee et al. | |
| 2021/0051653 A1 | 2/2021 | Park et al. | |
| 2021/0144743 A1* | 5/2021 | Rastegardoost | H04W 72/23 |
| 2022/0311647 A1* | 9/2022 | Cheng | H04L 27/2675 |
| 2023/0034052 A1* | 2/2023 | Mukherjee | H04L 27/368 |

FOREIGN PATENT DOCUMENTS

| | | | | |
|---|---|---|---|---|
| CN | 110169025 A | * | 8/2019 | H04B 7/0456 |
| CN | 110720181 A | | 1/2020 | |
| KR | 20070077008 A | * | 4/2006 | H04L 5/0048 |
| WO | 2018071094 A1 | | 4/2018 | |

* cited by examiner

PHASE TRACKING REFERENCE SIGNAL PILOT ALLOCATION SIZES

FIELD OF THE DISCLOSURE

Aspects of the present disclosure generally relate to wireless communication and to techniques and apparatuses for phase tracking reference signal pilot allocation sizes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication associated with phase noise characteristics of the UE. The method may include receiving an indication of pilot allocation sizes, for different data modulation and coding schemes (MCSs) for communications, of frequency-domain contiguous pilots for phase noise mitigation based at least in part on the indication associated with the phase noise characteristics of the UE.

Some aspects described herein relate to a method of wireless communication performed by a UE. The method may include obtaining one or more metrics associated with phase noise mitigation for a communication. The method may include transmitting an indication of a preferred pilot allocation size, for the communication, of frequency-domain contiguous pilots for phase noise mitigation.

Some aspects described herein relate to a method of wireless communication performed by a base station. The method may include receiving an indication associated with phase noise characteristics of a UE. The method may include transmitting an indication of pilot allocation sizes, for different data MCSs for communications, of frequency-domain contiguous pilots for phase noise mitigation based at least in part on the indication associated with the phase noise characteristics of the UE.

Some aspects described herein relate to a method of wireless communication performed by a base station. The method may include obtaining one or more metrics associated with phase noise mitigation for a communication. The method may include receiving an indication of a preferred pilot allocation size, for the communication, of frequency-domain contiguous pilots for phase noise mitigation.

Some aspects described herein relate to a UE for wireless communication. The user equipment may include a memory and one or more processors coupled to the memory. The one or more processors may be configured to transmit an indication associated with phase noise characteristics of the UE. The one or more processors may be configured to receive an indication of pilot allocation sizes, for different data MCSs for communications, of frequency-domain contiguous pilots for phase noise mitigation based at least in part on the indication associated with the phase noise characteristics of the UE.

Some aspects described herein relate to a UE for wireless communication. The UE may include a memory and one or more processors coupled to the memory. The one or more processors may be configured to obtain one or more metrics associated with phase noise mitigation for a communication. The one or more processors may be configured to transmit an indication of a preferred pilot allocation size, for the communication, of frequency-domain contiguous pilots for phase noise mitigation.

Some aspects described herein relate to a base station for wireless communication. The base station may include a memory and one or more processors coupled to the memory. The one or more processors may be configured to receive an indication associated with phase noise characteristics of a UE. The one or more processors may be configured to transmit an indication of pilot allocation sizes, for different data MCSs for communications, of frequency-domain contiguous pilots for phase noise mitigation based at least in part on the indication associated with the phase noise characteristics of the UE.

Some aspects described herein relate to a base station for wireless communication. The base station may include a memory and one or more processors coupled to the memory. The one or more processors may be configured to obtain one or more metrics associated with phase noise mitigation for a communication. The one or more processors may be configured to receive an indication of a preferred pilot allocation size, for the communication, of frequency-domain contiguous pilots for phase noise mitigation.

Some aspects described herein relate to a non-transitory computer-readable medium that stores a set of instructions for wireless communication by a UE. The set of instructions, when executed by one or more processors of the UE, may cause the UE to transmit an indication associated with phase noise characteristics of the UE. The set of instructions, when executed by one or more processors of the UE, may cause the UE to receive an indication of pilot allocation sizes, for different data MCSs for communications, of frequency-domain contiguous pilots for phase noise mitigation based at least in part on the indication associated with the phase noise characteristics of the UE.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to obtain one or more metrics associated with phase noise mitigation for a communication. The set of instructions, when executed by one or more processors of the one or more instructions that, when executed by one or more processors of a UE, may cause the one or more instructions that, when executed by one or more processors of a UE to transmit an indication of a preferred pilot allocation size, for the communication, of frequency-domain contiguous pilots for phase noise mitigation.

Some aspects described herein relate to a non-transitory computer-readable medium that stores a set of instructions for wireless communication by a base station. The set of instructions, when executed by one or more processors of the base station, may cause the base station to receive an indication associated with phase noise characteristics of a UE. The set of instructions, when executed by one or more processors of the base station, may cause the base station to transmit an indication of pilot allocation sizes, for different data MCSs for communications, of frequency-domain contiguous pilots for phase noise mitigation based at least in part on the indication associated with the phase noise characteristics of the UE.

Some aspects described herein relate to a non-transitory computer-readable medium that stores a set of instructions for wireless communication by a base station. The set of instructions, when executed by one or more processors of the base station, may cause the base station to obtain one or more metrics associated with phase noise mitigation for a communication. The set of instructions, when executed by one or more processors of the base station, may cause the base station to receive an indication of a preferred pilot allocation size, for the communication, of frequency-domain contiguous pilots for phase noise mitigation.

Some aspects described herein relate to an apparatus for wireless communication. The apparatus may include means for transmitting an indication associated with phase noise characteristics of the UE. The apparatus may include means for receiving an indication of pilot allocation sizes, for different data MCSs for communications, of frequency-domain contiguous pilots for phase noise mitigation based at least in part on the indication associated with the phase noise characteristics of the UE.

Some aspects described herein relate to an apparatus for wireless communication. The apparatus may include means for obtaining one or more metrics associated with phase noise mitigation for a communication. The apparatus may include means for transmitting an indication of a preferred pilot allocation size, for the communication, of frequency-domain contiguous pilots for phase noise mitigation.

Some aspects described herein relate to an apparatus for wireless communication. The apparatus may include means for receiving an indication associated with phase noise characteristics of a UE. The apparatus may include means for transmitting an indication of pilot allocation sizes, for different data MCSs for communications, of frequency-domain contiguous pilots for phase noise mitigation based at least in part on the indication associated with the phase noise characteristics of the UE.

Some aspects described herein relate to an apparatus for wireless communication. The apparatus may include means for obtaining one or more metrics associated with phase noise mitigation for a communication. The apparatus may include means for receiving an indication of a preferred pilot allocation size, for the communication, of frequency-domain contiguous pilots for phase noise mitigation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
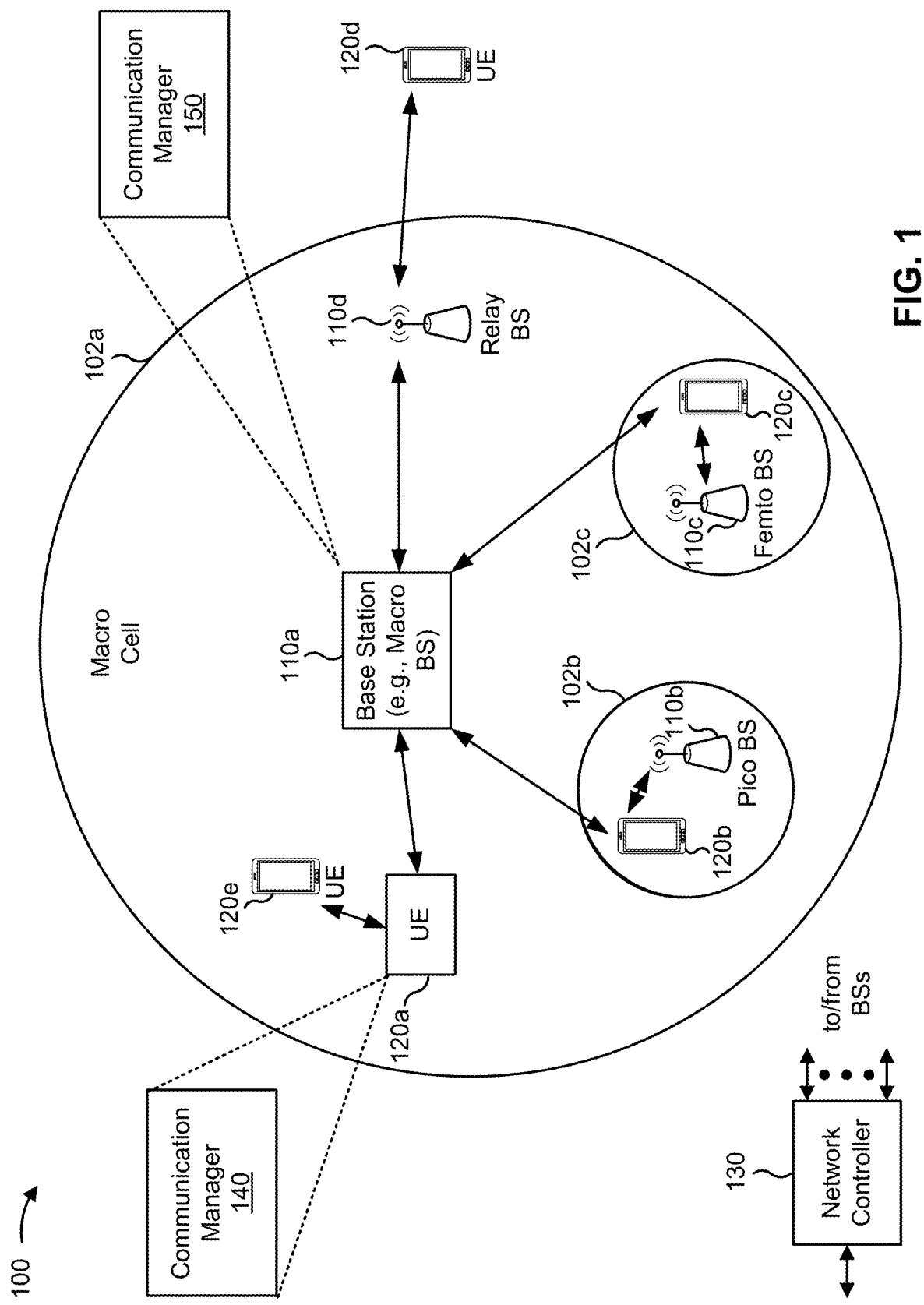
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication associated with phase noise characteristics of the UE; and receive an indication of pilot allocation sizes, for different data MCSs for communications, of frequency-domain contiguous pilots for phase noise mitigation based at least in part on the indication associated with the phase noise characteristics of the UE. Additionally, or alternatively, the communication manager 140 may perform one or more other operations described herein.

In some aspects, the UE 120 may include a communication manager 140. As described in more detail elsewhere herein, the communication manager 140 may obtain one or more metrics associated with phase noise mitigation for a communication; and transmit an indication of a preferred pilot allocation size, for the communication, of frequency-domain contiguous pilots for phase noise mitigation. Additionally, or alternatively, the communication manager 140 may perform one or more other operations described herein.

In some aspects, the base station 110 may include a communication manager 150. As described in more detail elsewhere herein, the communication manager 150 may receive an indication associated with phase noise characteristics of a UE; and transmit an indication of pilot allocation sizes, for different data MCSs for communications, of frequency-domain contiguous pilots for phase noise mitigation based at least in part on the indication associated with the phase noise characteristics of the UE. Additionally, or alternatively, the communication manager 150 may perform one or more other operations described herein.

In some aspects, the base station 110 may include a communication manager 150. As described in more detail elsewhere herein, the communication manager 150 may obtain one or more metrics associated with phase noise mitigation for a communication; and receive an indication of a preferred pilot allocation size, for the communication, of frequency-domain contiguous pilots for phase noise mitigation. Additionally, or alternatively, the communication manager 150 may perform one or more other operations described herein.

As indicated above, FIG. 1 is provided as an example. Other examples may differ from what is described with regard to FIG. 1.

Figure 2:
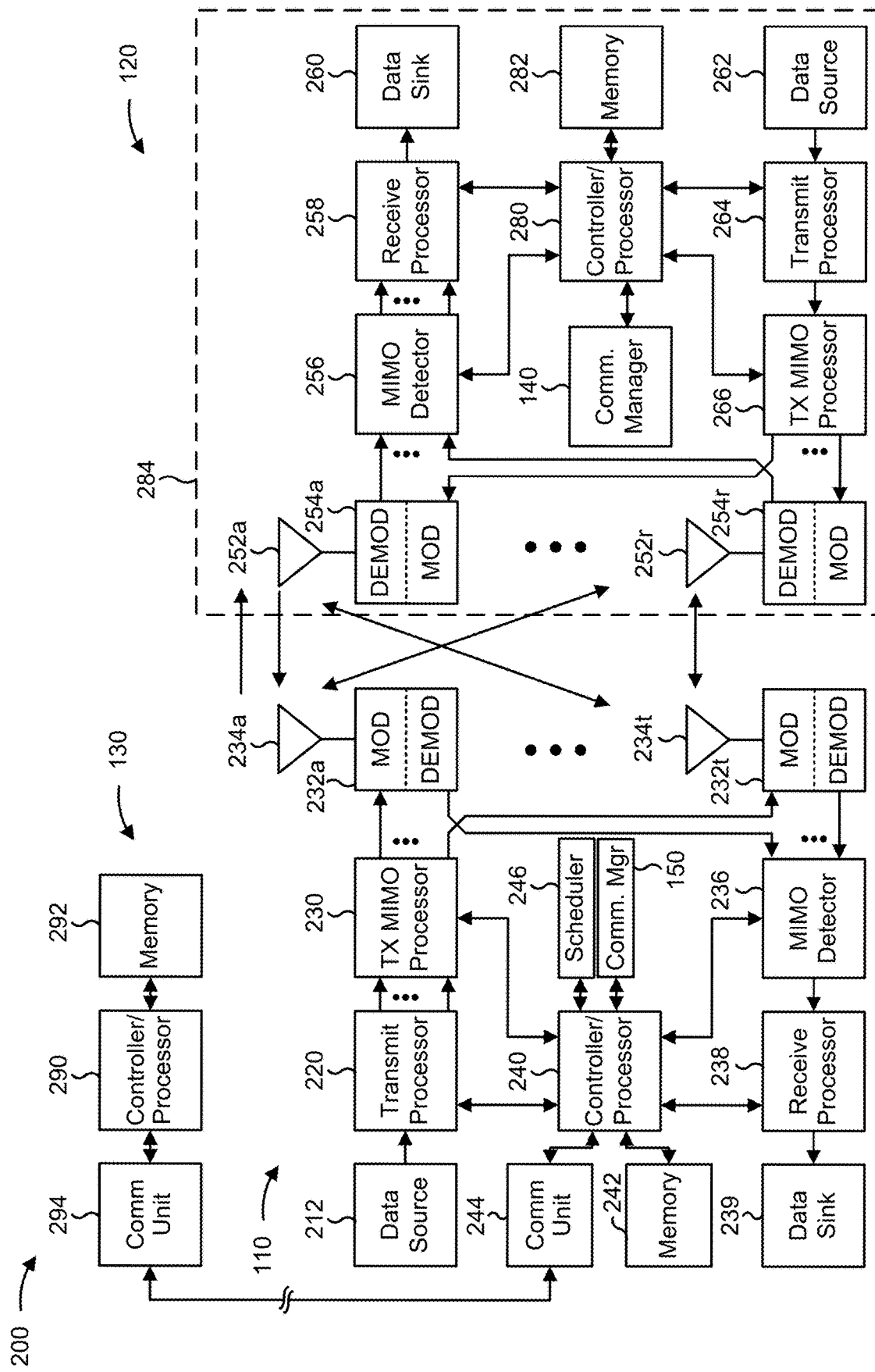
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with phase tracking reference signal (PTRS) pilot allocation sizes, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for transmitting an indication associated with phase noise characteristics of the UE (e.g., using controller/processor 280, transmit processor 264, TX MIMO processor 266, modem 254, antenna 252, memory 282, or the like); and/or means for receiving an indication of pilot allocation sizes, for different data MCSs for communications, of frequency-domain contiguous pilots for phase noise mitigation based at least in part on the indication associated with the phase noise characteristics of the UE (e.g., using antenna 252, modem 254, MIMO detector 256, receive processor 258, controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for obtaining one or more metrics associated with phase noise mitigation for a communication (e.g., using antenna 252, modem 254, MIMO detector 256, receive processor 258, controller/processor 280, memory 282, or the like); and/or means for transmitting an indication of a preferred pilot allocation size, for the communication, of frequency-domain contiguous pilots for phase noise mitigation (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving an indication associated with phase noise characteristics of a UE (e.g., using antenna 234, modem 232, MIMO detector 236, receive processor 238, controller/processor 240, memory 242, or the like); and/or means for transmitting an indication of pilot allocation sizes, for different data MCSs for communications, of frequency-domain contiguous pilots for phase noise mitigation based at least in part on the indication associated with the phase noise characteristics of the UE (e.g., using controller/processor 240, transmit processor 220, TX MIMO processor 230, modem 232, antenna 234, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for obtaining one or more metrics associated with phase noise mitigation for a communication(e.g., using antenna 234, modem 232, MIMO detector 236, receive processor 238, controller/processor 240, memory 242, or the like); and/or means for receiving an indication of a preferred pilot allocation size, for the communication, of frequency-domain contiguous pilots for phase noise mitigation (e.g., using antenna 234, modem 232, MIMO detector 236, receive processor 238, controller/processor 240, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
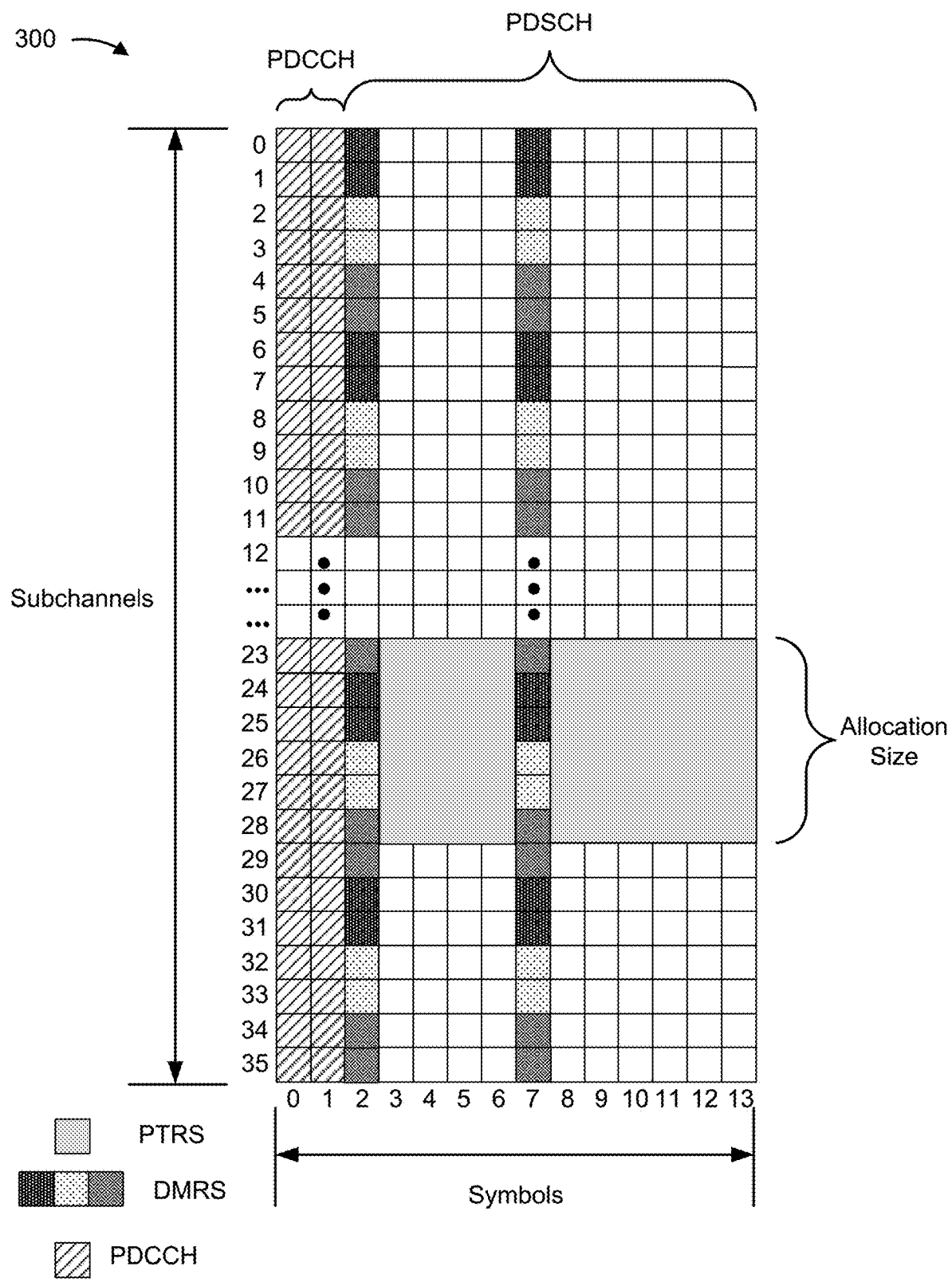
FIG. 3 is a diagram illustrating an example phase tracking reference signal structure in a physical downlink shared channel, in accordance with the present disclosure.

FIG. 3 is a diagram illustrating an example 300 PTRS structure in a physical downlink shared channel (PDSCH), in accordance with the present disclosure. As shown, the PDSCH may include a number of subchannels (e.g., 36 subchannels) and a number of symbols (e.g., 14 symbols).

Although example 300 describes PTRSs, any type of pilots for phase noise mitigation may be used instead of PTRSs. For example, enhanced PTRSs (ePTRSs) may be used to carry both PTRS sequences along with data. In other words, a PDSCH, or a physical uplink shared channel (PUSCH), may be transmitted having data (e.g., application data, streaming data, and/or data communicated with an application server, among other examples) multiplexed with a PTRS sequence in resources allocated for PTRSs.

A base station may transmit, and a UE may receive (e.g., or attempt to receive), PTRSs, DMRSs, and/or data, using the PDSCH. Although described with reference to a PDSCH, the structure may be similarly applied to a PUSCH.

The PTRSs may be a pilot for the PDSCH and may have a density in a frequency domain (e.g., relative to subcarriers) and a time domain (e.g., relative to symbols allocated for data). As shown in FIG. 3, the PTRSs may be frequency-domain contiguous pilots. An allocation size of the PTRSs indicates a number of contiguous subchannels allocated to the PTRSs. For example, as shown in FIG. 3., the PTRSs may be described as having an allocation size of 6 subchannels spanning from subchannel 23 through subchannel 28.

In some examples, the PTRSs may be allocated using 1 resource (e.g., a set of subchannels) per 2 resource blocks or 1 resource per 4 resource blocks, among other examples. A configuration of the PTRSs may be configured (e.g., using radio resource control (RRC) signaling) and/or may be based at least in part on an associated modulation and coding scheme (MCS) of the PDSCH. The PTRSs may be defined by a Gold sequence that is known to a receiving device such that the receiving device can compare received signaling to the Gold sequence to determine phase noise and/or inter-cell interference (ICI).

As shown, the PDSCH may have a number (e.g., 2) of single-symbol DMRSs of a DMRS type (e.g., DMRS type 2). In some examples, the PDSCH may have 1 DMRS symbol per resource block. A receiving device may use the DMRS to roughly estimate and/or correct a frequency-based error within the symbol that includes the DMRS.

A PDSCH or a PUSCH may include PTRSs for a receiving device (e.g., a UE and/or a base station, among other examples) to account for residual frequency offset (e.g., a frequency offset that is developed within a resource block or slot), phase noise (e.g., introduced by an oscillator at a transmitting device and/or the receiving device, among other examples), and/or a common phase error (e.g., a common phase rotation of subcarriers of the PDSCH and/or the PUSCH, among other examples), among other examples. For example, a receiving device may use the PTRSs to estimate and/or correct phase noise (e.g., based at least in part on a detected residual frequency offset and/or a common phase error (CPE), among other examples).

As indicated above, FIG. 3 is provided as an example. Other examples may differ from what is described with respect to FIG. 3.

For communications using high frequency carrier waves (e.g., FR2 or above), phase noise may be an impairment to the communications that limits throughput of a communication channel. PTRSs may be used to enable a receiving device to estimate the phase noise and a residual frequency offset and to correct based at least in part on the estimate. A receiving device may correct for the phase noise and the residual frequency offset based at least in part on receiving the PTRSs.

Phase noise, if not corrected, is a multiplicative process (e.g., a compounding process) in the time domain that results in cyclic convolution of a PDSCH with corresponding phase noise taps in the frequency domain. Uncorrected phase noise leads to CPE and ICI related error and/or a noise floor that may limit communication efficiencies based at least in part on an integrated phase noise (IPN). In some networks, phase noise mask characteristics may cause increased phase noise-based ICI in high signal-to-noise ratio (SNR) situations that have relatively high MCS communications and relatively high modulation orders. ICI taps and/or sequences representing frequency domain phase noise responses may be different per symbol and the same for all resource elements and/or for all reception and transmission antenna groups.

Some PTRSs allow a receiving device to correct for CPE, but not for ICI. An uncorrected ICI may lead to an error floor that limits throughput of a communication channel even if CPE is corrected (e.g., based at least in part on limiting a highest operational MCS). Additionally, or alternatively, the uncorrected ICI may limit a highest operational modulation order for millimeter wave communications (e.g., to 1k quadrature amplitude modulation (QAM) or 256 QAM, among other examples).

Using PTRSs may be unnecessary when, for example, a receiving device can decode an associated uplink transmission or downlink transmission without using the PTRSs to estimate and/or correct phase noise. By allocating resources for PTRSs, a UE and/or a base station may consume computing, communication, and/or network resources that may be used to improve other aspects of communications such as throughput. Additionally, or alternatively, by allocating too many resources for PTRSs (e.g., with a pilot size that is oversized), a UE and/or a base station may consume computing, communication, and/or network resources that may be used to improve other aspects of communications such as throughput.

In some aspects described herein, PTRSs may be configured as frequency-domain contiguous pilots for phase noise mitigation (e.g., ePTRSs). In this way, the receiving device may perform ICI estimation and correction using the PTRSs. However, the PTRSs consume resources that may have otherwise been used for data in the PDSCH. To mitigate a loss of throughput from resources consumed by the PTRSs, the PTRSs may be multiplexed with data (e.g., data aided PTRSs). The PTRSs may be configured with an MCS that is a low-order MCS so the PTRSs are not sensitive to the ICI floor. In this way, the receiving device may have an improved likelihood of successfully decoding the PTRS resource elements prior to ICI estimation and mitigation for remaining resource elements (e.g., data-carrying resource elements).

In some aspects described herein the UE may transmit information for the base station to select a pilot allocation size for the frequency-domain contiguous pilots for phase noise mitigation (e.g., the PTRSs). For example, the UE may transmit an indication of a preferred pilot allocation size and/or an indication associated with phase noise characteristics of the UE. The base station may select a pilot allocation size for a particular set of communications (e.g., using dynamic signaling) and/or may configure different allocation sizes for different MCSs and/or channel allocations for communications (e.g., using semi-static signaling).

In some aspects, the network (e.g., a base station) may configure the UE with selected pilot (e.g., PTRS) allocation sizes (e.g., length sizes) for different MCS ranges and/or allocation sizes (e.g., using RRC signaling). For example, the base station may provide a table, or other storage configuration, that specifies data MCS and/or channel allocation size thresholds for different pilot allocation sizes. The table may indicate a pilot allocation size that will be used for each range of data MCSs and/or each range of allocation sizes. The UE may transmit an indication of a preference of PTRS allocation sizes for different MCSs. In some aspects, the preference may be based at least in part on phase noise characteristic of the UE (e.g., based at least in part on components of the UE). In some aspects, an MCS that satisfies a particular threshold may map to a pilot allocation size of 0 (e.g., no pilots). This particular threshold may be signaled by the UE. In some aspects, a channel allocation threshold that satisfies a particular threshold may map to a pilot allocation size of 0 (e.g., no pilots). This particular threshold may be signaled by the UE. In some aspects, the UE may transmit an indication of a maximum pilot MCS for transmitting data on the resource elements allocated for the frequency-domain contiguous pilots.

In some aspects, the UE may transmit an indication of a preference for a preferred pilot allocation size. For example, the UE may dynamically signal the preference based at least in part on the UE phase noise characteristics, an SNR, and/or an MCS (e.g., of a previous slot or an expected MCS for a subsequent communication). The UE may signal the preference via a channel state information (CSI) report. For example, the indication may include a selection of a candidate pilot allocation size from a set of candidate pilot allocation sizes (e.g., preconfigured via RRC signaling and/or a communication protocol). A channel state feedback (e.g., within the CSI report) may indicate CSI (e.g., CQI) based at least in part on assuming that the preferred pilot allocation size is adopted. In some aspects, the preference may be for a pilot allocation size of zero. In some aspects, the base station may signal the pilot allocation size for one or more communications within downlink control information (DCI). For example, the base station may signal the pilot allocation size via a new field of the DCI. The new field may indicate acceptance of the preference or a pilot allocation size relative to the preference, among other examples. The base station may further indicate an MCS for the data multiplexed with the pilots on a pilot allocation.

In some aspects, blind ICI mitigation (e.g., using PTRSs having data multiplexed) can be used in context of a high order QAM (for example 1024 QAM, 512 QAM) for FR2 or higher bands scenario (under an assumption that phase noise is a dominant factor of an error floor in a high SNR region). In some aspects, blind ICI mitigation can be used in context of a high order QAM (for example 4096 QAM, 2048 QAM) for FR1 scenario (e.g., in an integrated access and backhaul (IAB) or CPE use case).

Based at least in part on the UE indicating information for the base station to select a pilot allocation size, the pilot allocation size may improve spectral efficiency based at least in part on characteristics of the UE and/or conditions of a communication (e.g., channel conditions, MCS, and/or channel allocation size, among other examples). This may conserve communication, network, and/or power resources that may otherwise be used to communicate using additional transmissions and/or larger channel allocations to communicate a same amount of data.

Figure 4:
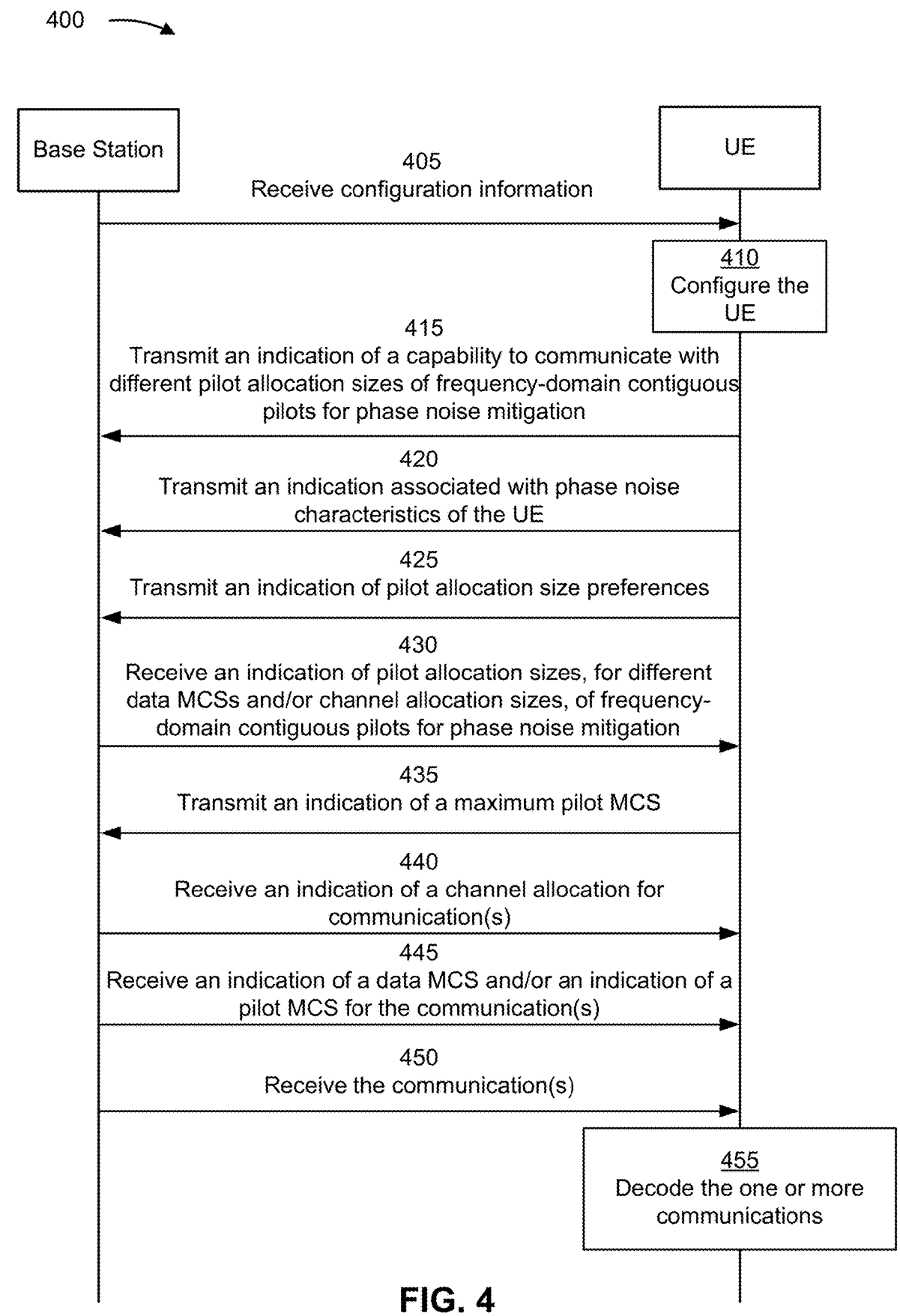
FIG. 4-5 are diagrams illustrating examples associated with phase tracking reference signal pilot allocation sizes, in accordance with the present disclosure.

FIG. 4 is a diagram illustrating an example 400 associated with PTRS pilot allocation sizes, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 4. The UE and the base station may communicate using frequency-domain contiguous pilots for phase noise mitigation that include PTRSs communicated over multiple adjacent frequency resources. The PTRSs may be configured to carry data and may be configured to have a pilot MCS that may be different from a data MCS applied to data resource elements of a channel allocation.

As shown by reference number 405, the base station may transmit, and the UE may receive, configuration information. In some aspects, the UE may receive the configuration information via one or more of RRC signaling, medium access control (MAC) control elements (MAC CEs), and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of a capability (e.g., support) to communicate with different pilot allocation sizes of frequency-domain contiguous pilots for phase noise mitigation. The different pilot allocation sizes may be configured for use for communications using different MCSs and/or different channel allocation sizes. In some aspects, the configuration information may indicate that the UE is to transmit an indication associated with phase noise characteristics of the UE (e.g., capabilities to mitigate phase noise). In some aspects, the configuration information may indicate that the UE is to transmit an indication of a pilot allocation size preference (e.g., for different MCSs and/or different allocation sizes). In some aspects, the configuration information may indicate that the UE is to transmit an indication of a maximum pilot MCS for data multiplexed with the pilots on the pilot allocation.

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of a capability to communicate with different pilot allocation sizes of frequency-domain contiguous pilots for phase noise mitigation. In some aspects, the UE may transmit the indication of support via RRC signaling (e.g., as part of an RRC connection process).

As shown by reference number 420, the UE may transmit an indication associated with phase noise characteristics of the UE. The UE may transmit the indication along with the indication of the capability to communicate with different pilot allocation sizes of frequency-domain contiguous pilots for phase noise mitigation (e.g., via RRC signaling). In some aspects, the phase noise characteristic of the UE may include a model used by the UE to correct phase noise.

As shown by reference number 425, the UE may transmit an indication of pilot allocation size preferences. The pilot allocation size preferences may indicate preferences for different MCSs and/or for different channel allocation sizes. The preferences may be based at least in part on the phase noise characteristics of the UE. In some aspects, the UE may transmit the indication of the pilot allocation size preferences along with the indication associated with the phase noise characteristic of the UE and/or the indication associated with the phase noise characteristic of the UE may include the indication of the pilot allocation size preferences.

As shown by reference number 430, the UE may receive an indication of pilot allocation sizes, for different data MCSs and/or channel allocation sizes, of frequency-domain contiguous pilots for phase noise mitigation. In some aspects, the UE may receive the indication of the pilot allocation sizes via RRC signaling and/or one or more MAC CEs.

The indication of the pilot allocation sizes may be based at least in part on the indication associated with the phase noise characteristics of the UE. For example, the base station may transmit an indication of mappings between different MCSs and/or channel allocation sizes to different pilot allocation sizes. In some aspects, the indication of the pilot allocation sizes maps the pilot allocation sizes to different data MCSs or different channel allocation sizes. In some aspects, the indication of the pilot allocation sizes maps a channel allocation size to a pilot allocation size of zero.

As shown by reference number 435, the UE may transmit an indication of a maximum pilot MCS. For example, the UE may indicate a maximum pilot MCS that the UE supports demodulating and decoding within a threshold amount of time (e.g., with a latency that allows the UE to decode the data resource elements within a threshold amount of time).

As shown by reference number 440, the UE may receive an indication of a channel allocation for one or more communications. In some aspects, the channel allocation may include an allocation of resources to be used for the pilots (e.g., pilot resource elements) and for data (e.g., data resource elements).

As shown by reference number 445, the UE may receive an indication of a data MCS and/or an indication of a pilot MCS for the one or more communications. In some aspects, the data MCS is greater than the pilot MCS. For example, the pilot MCS may be relatively low to improve a likelihood of successfully decoding the pilot resource elements so the pilot resource elements can be used to correct ICI and phase noise before decoding the data resource elements. In some aspects, the data MCS for the communications is based at least in part on the indication of pilot allocation size preferences.

As shown by reference number 450, the UE may receive the one or more communications. For example, the UE may receive the one or more communications having frequency-domain contiguous pilots for phase noise mitigation based at least in part on the indication of the preferred pilot allocation size. The UE may receive the one or more communications based at least in part on monitoring resources indicated in the channel allocation.

As shown by reference number 455, the UE may decode the one or more communications. For example, the UE may demodulate signals received via the pilot resource elements and use the pilot resource elements to perform ICI and CPE mitigation. The UE may apply the ICI and CPE mitigation to the data resource elements along with other corrections (e.g., based at least in part on demodulation reference signals) to decode the data resource elements.

Based at least in part on the UE transmitting the indication associated with phase noise characteristics of the UE, the base station may select a pilot allocation size that improves spectral efficiency of communications with the UE. This may conserve communication, network, and/or power resources that may otherwise be used to communicate using additional transmissions and/or larger channel allocations to communicate a same amount of data.

Figure 5:
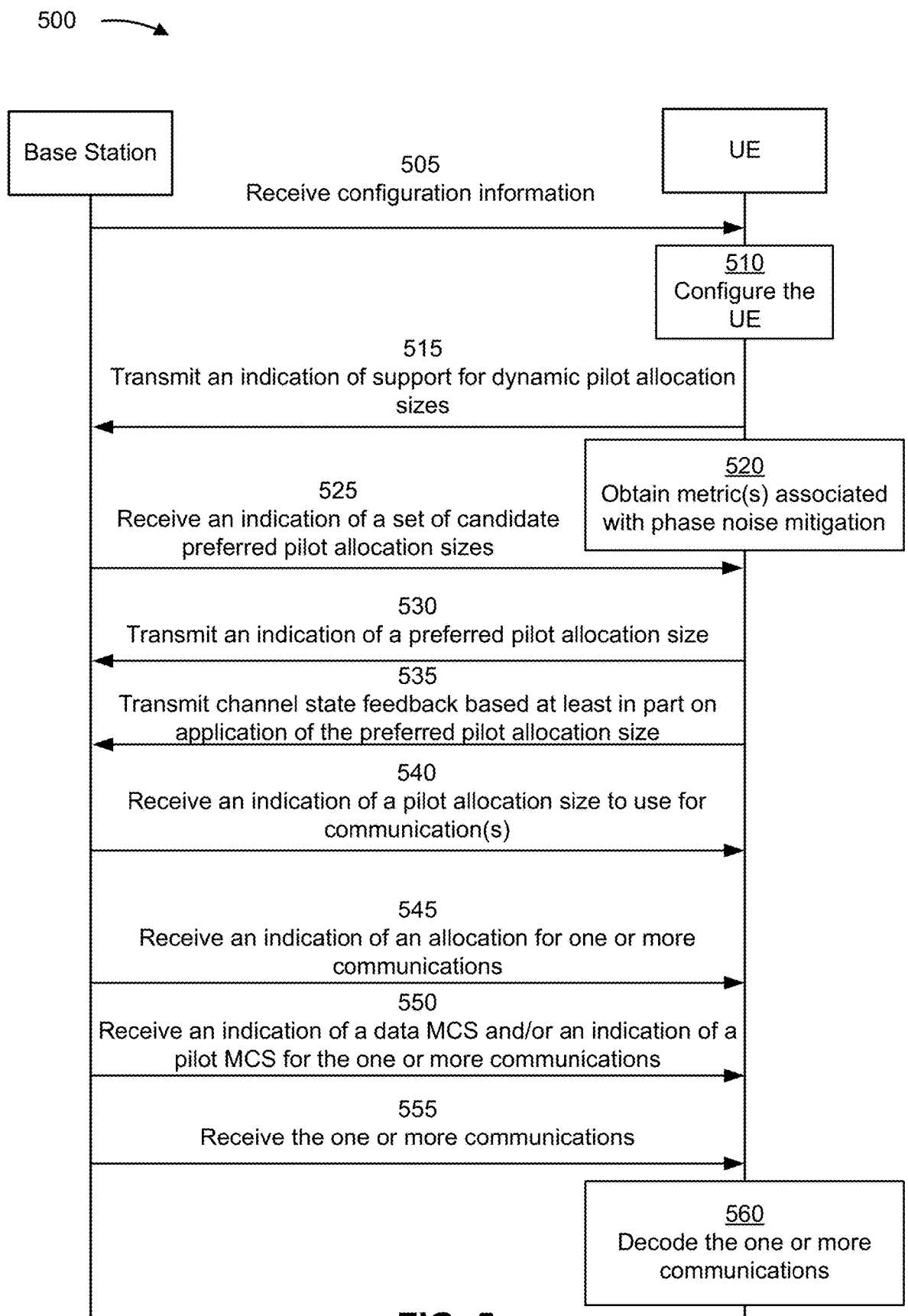

FIG. 5 is a diagram illustrating an example 500 associated with PTRS pilot allocation sizes, in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 5. The UE and the base station may communicate using frequency-domain contiguous pilots for phase noise mitigation that include PTRSs communicated over multiple adjacent frequency resources. The PTRSs may be configured to carry data and may be configured to have a pilot MCS that may be different from a data MCS applied to data resource elements of a channel allocation.

As shown by reference number 505, the base station may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of support for dynamic pilot allocation sizes. In some aspects, the configuration information may indicate that the UE is to transmit an indication of a preferred pilot allocation size for one or more communications. In some aspects, the configuration information may indicate that the UE is to transmit channel state feedback (CSF) based at least in part on an assumption that the preferred pilot allocation size is to be used on an associated communication.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the base station may receive, an indication of support for dynamic pilot allocation sizes. In some aspects, the UE may transmit the indication of support via RRC signaling (e.g., as part of an RRC connection process).

As shown by reference number 520, the UE may obtain one or more metrics associated with phase noise mitigation. For example, the one or more metrics may include parameters associated with components of the UE and/or parameters associated with channel conditions. In some aspects, the one or more metrics include a model used by the UE to correct phase noise, channel metrics for a channel used for the communication, Doppler affects for the channel, a signal-to-interference-plus-noise ratio (SINR), and/or an SNR (e.g., based at least in part on measurements of reference signals).

As shown by reference number 525, the UE may receive an indication of a set of candidate preferred pilot allocation sizes. In some aspects, the UE may receive the indication of the set of candidate preferred pilot allocation sizes via RRC signaling and/or one or more MAC CEs.

As shown by reference number 530, the UE may transmit an indication of a preferred pilot allocation size. For example, the indication of the preferred pilot allocation size may indicate the preferred pilot allocation size from the set of candidate preferred pilot allocation sizes. In some aspects, the UE may transmit the indication of the preferred pilot allocation size independently from (e.g., in the absence of) the set of candidate preferred pilot allocation sizes.

As shown by reference number 535, the UE may transmit CSF based at least in part on application of the preferred pilot allocation size. For example, the UE may transmit an indication of a CQI and/or other metrics (e.g., based at least in part on measuring reference signals) that use an assumption of a communication having the preferred pilot allocation size.

As shown by reference number 540, the UE may receive an indication of a pilot allocation size to use for one or more communications. In some aspects, the pilot allocation size may be the preferred pilot allocation size or may be based at least in part on the preferred pilot allocation size. The UE may receive the indication of the pilot allocation size via dynamic signaling, such as DCI or one or more MAC CEs. For example, the DCI may include the indication, which may indicate the pilot allocation size via an indication of whether the preferred pilot allocation size is applied to one or more communications or an indication of the pilot allocation size relative to the preferred pilot allocation size.

As shown by reference number 545, the UE may receive an indication of an allocation of one or more communications. In some aspects, the channel allocation may include an allocation of a resource to be used for the pilots (e.g., pilot resource elements) and for data (e.g., data resource elements).

As shown by reference number 550, the UE may receive an indication of a data MCS and/or an indication of a pilot MCS for the one or more communications. In some aspects, the data MCS is greater than the pilot MCS. For example, the pilot MCS may be relatively low to improve a likelihood of successfully decoding the pilot resource elements so the pilot resource elements can be used to correct ICI and phase noise before decoding the data resource elements. In some aspects, the data MCS for the communications is based at least in part on the indication of pilot allocation size preferences.

As shown by reference number 555, the UE may receive the one or more communications. For example, the UE may receive the one or more communications having frequency-domain contiguous pilots for phase noise mitigation based at least in part on the indication of the preferred pilot allocation size. The UE may receive the one or more communications based at least in part on monitoring resources indicated in the channel allocation.

As shown by reference number 560, the UE may decode the one or more communications. For example, the UE may demodulate signals received via the pilot resource elements and use the pilot resource elements to perform ICI and CPE mitigation. The UE may apply the ICI and CPE mitigation to the data resource elements along with other corrections (e.g., based at least in part on demodulation reference signals) to decode the data resource elements.

Based at least in part on the UE transmitting the preferred pilot allocation size, the base station may select a pilot allocation size that improves spectral efficiency of communications with the UE. This may conserve communication, network, and/or power resources that may otherwise be used to communicate using additional transmissions and/or larger channel allocations to communicate a same amount of data.

Figure 6:
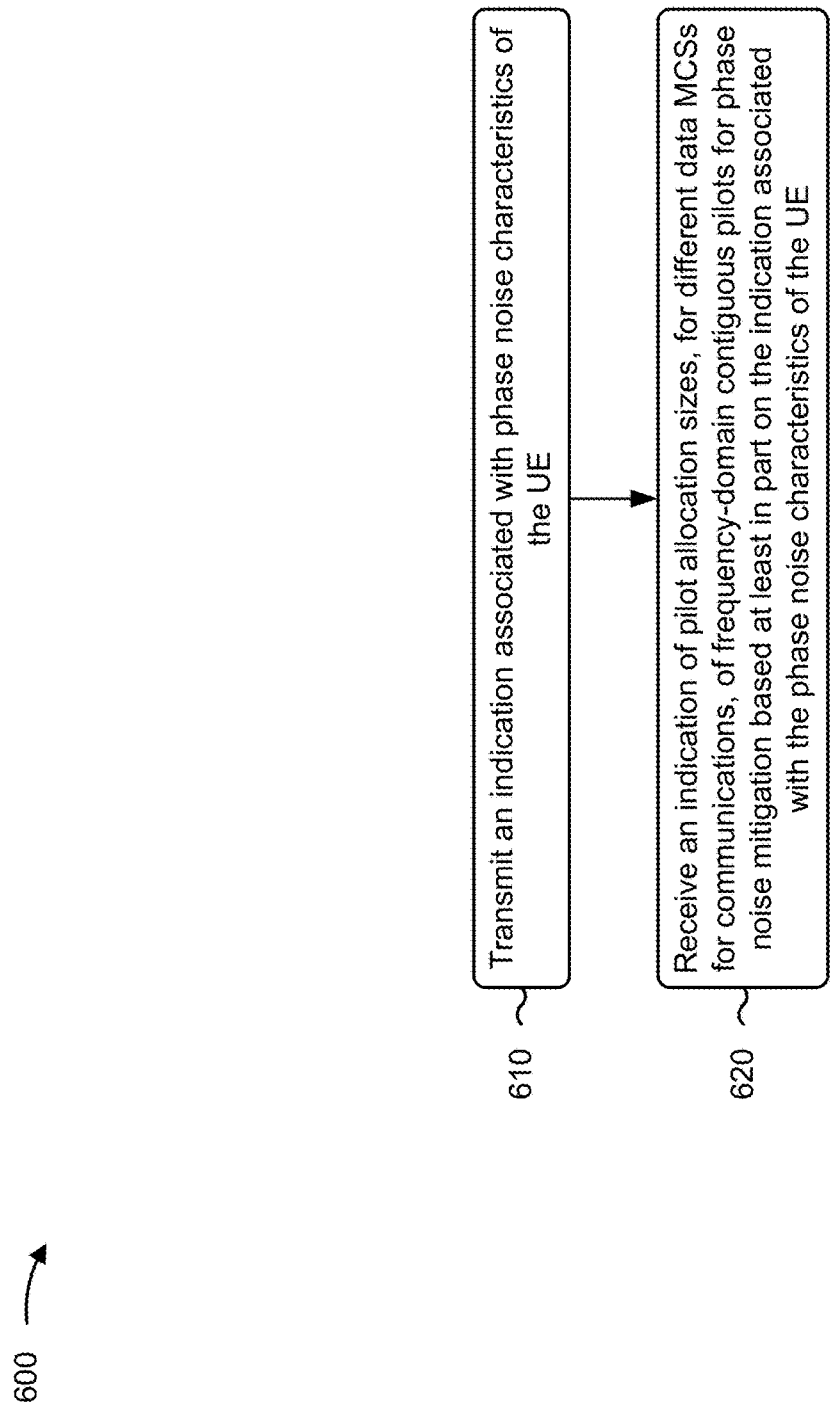
FIGS. 6-9 are diagrams illustrating example processes associated with phase tracking reference signal pilot allocation sizes, in accordance with the present disclosure.

FIG. 6 is a diagram illustrating an example process 600 performed, for example, by a UE, in accordance with the present disclosure. Example process 600 is an example where the UE (e.g., UE 120) performs operations associated with phase tracking reference signal pilot allocation sizes.

As shown in FIG. 6, in some aspects, process 600 may include transmitting an indication associated with phase noise characteristics of the UE (block 610). For example, the UE (e.g., using communication manager 140 and/or transmission component 1004, depicted in FIG. 10) may transmit an indication associated with phase noise characteristics of the UE, as described above.

As further shown in FIG. 6, in some aspects, process 600 may include receiving an indication of pilot allocation sizes, for different data MCSs for communications, of frequency-domain contiguous pilots for phase noise mitigation based at least in part on the indication associated with the phase noise characteristics of the UE (block 620). For example, the UE (e.g., using communication manager 140 and/or reception component 1002, depicted in FIG. 10) may receive an indication of pilot allocation sizes, for different data MCSs for communications, of frequency-domain contiguous pilots for phase noise mitigation based at least in part on the indication associated with the phase noise characteristics of the UE, as described above.

Process 600 may include additional aspects, such as any single aspect or any combination of aspects described below and/or in connection with one or more other processes described elsewhere herein.

In a first aspect, the phase noise characteristics comprise an indication of a model used by the UE to correct phase noise.

In a second aspect, alone or in combination with the first aspect, the frequency-domain contiguous pilots for phase noise mitigation comprise phase tracking reference signals communicated over multiple adjacent frequency resources.

In a third aspect, alone or in combination with one or more of the first and second aspects, the phase tracking reference signals are configured to carry data and are configured to have a pilot MCS.

In a fourth aspect, alone or in combination with one or more of the first through third aspects, process 600 includes transmitting an indication of a maximum pilot MCS for the communications.

In a fifth aspect, alone or in combination with one or more of the first through fourth aspects, the indication of the pilot allocation sizes maps the pilot allocation sizes to one or more of different data MCSs, or different channel allocation sizes.

In a sixth aspect, alone or in combination with one or more of the first through fifth aspects, the indication of the pilot allocation sizes maps a data MCS to a pilot allocation size of zero, or wherein the indication of the pilot allocation sizes maps a channel allocation size to a pilot allocation size of zero.

In a seventh aspect, alone or in combination with one or more of the first through sixth aspects, receiving the indication of the pilot allocation sizes comprises receiving the indication of the pilot allocation sizes via RRC-based signaling or via one or more MAC CEs.

In an eighth aspect, alone or in combination with one or more of the first through seventh aspects, process 600 includes transmitting an indication of pilot allocation size preferences based at least in part on the phase noise characteristics of the UE, wherein the indication of the pilot allocation sizes is based at least in part on the indication of pilot allocation size preferences.

In a ninth aspect, alone or in combination with one or more of the first through eighth aspects, process 600 includes receiving an indication of a data MCS for the communications, wherein the data MCS for the communications is based at least in part on the indication of pilot allocation size preferences.

In a tenth aspect, alone or in combination with one or more of the first through ninth aspects, process 600 includes receiving an indication of a channel allocation for the communications, wherein the allocation for the communications is based at least in part on the indication of pilot allocation size preferences.

In an eleventh aspect, alone or in combination with one or more of the first through tenth aspects, the indication of the pilot allocation sizes for the different data MCSs indicates a data MCS for which a pilot allocation size is zero.

In a twelfth aspect, alone or in combination with one or more of the first through eleventh aspects, process 600 includes transmitting an indication of a capability of the UE to communicate with different pilot allocation sizes for different data MCSs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
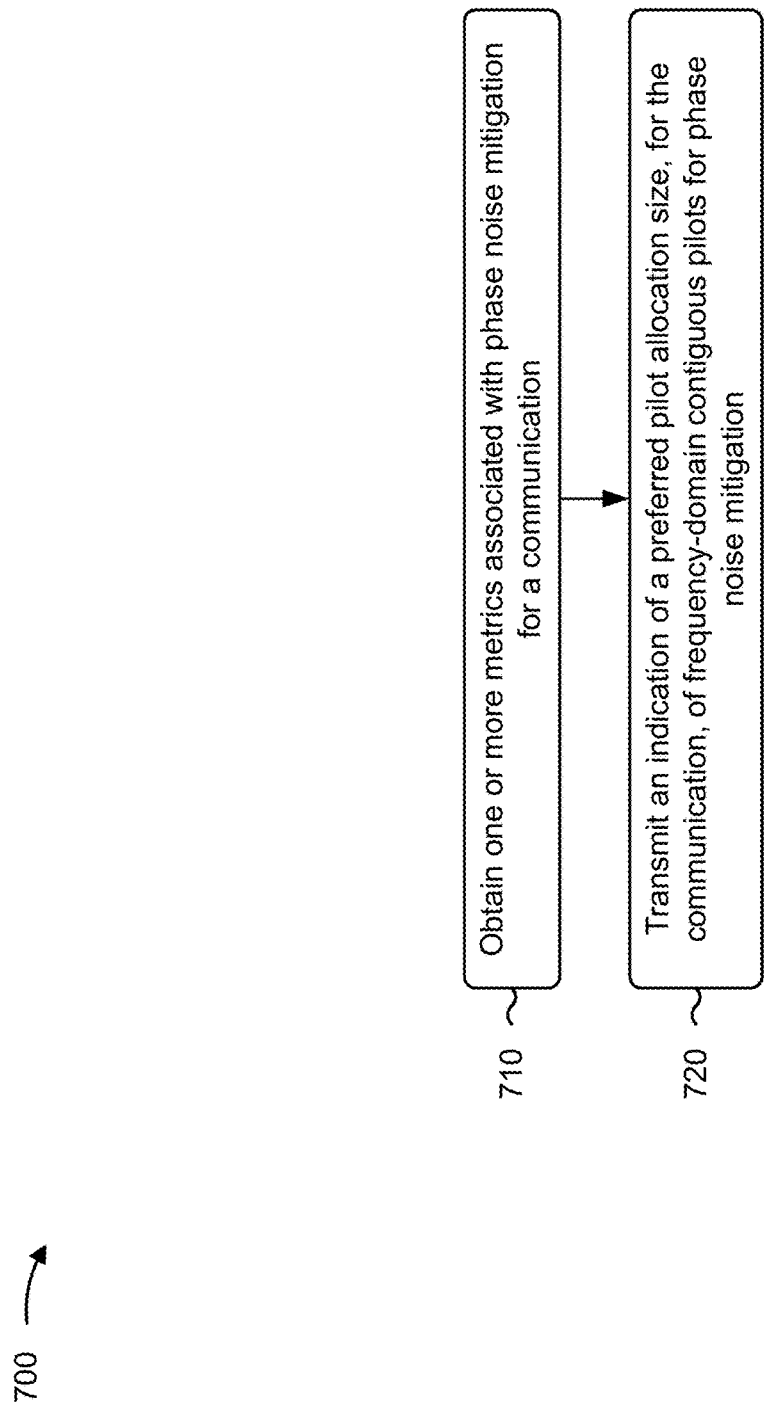

FIG. 7 is a diagram illustrating an example process 700 performed, for example, by a UE, in accordance with the present disclosure. Example process 700 is an example where the UE (e.g., UE 120) performs operations associated with phase tracking reference signal pilot allocation sizes.

As shown in FIG. 7, in some aspects, process 700 may include obtaining one or more metrics associated with phase noise mitigation for a communication (block 710). For example, the UE (e.g., using communication manager 140 and/or communication manager 1008, depicted in FIG. 10) may obtain one or more metrics associated with phase noise mitigation for a communication, as described above.

As further shown in FIG. 7, in some aspects, process 700 may include transmitting an indication of a preferred pilot allocation size, for the communication, of frequency-domain contiguous pilots for phase noise mitigation (block 720). For example, the UE (e.g., using communication manager 140 and/or transmission component 1004, depicted in FIG. 10) may transmit an indication of a preferred pilot allocation size, for the communication, of frequency-domain contiguous pilots for phase noise mitigation, as described above.

Process 700 may include additional aspects, such as any single aspect or any combination of aspects described below and/or in connection with one or more other processes described elsewhere herein.

In a first aspect, the one or more metrics associated with the phase noise mitigation for the communication comprise one or more of a model used by the UE to correct phase noise, channeling metrics for a channel used for the communication, Doppler affects for the channel, a signal-to-interference-plus-noise ratio, or a signal-to-noise ratio.

In a second aspect, alone or in combination with the first aspect, the indication of the preferred pilot allocation size indicates a selection of the preferred pilot allocation size from a set of candidate preferred pilot allocation sizes.

In a third aspect, alone or in combination with one or more of the first and second aspects, process 700 includes receiving an indication of the set of candidate preferred pilot allocation sizes.

In a fourth aspect, alone or in combination with one or more of the first through third aspects, process 700 includes receiving one or more communications having frequency-domain contiguous pilots for phase noise mitigation based at least in part on the indication of the preferred pilot allocation size.

In a fifth aspect, alone or in combination with one or more of the first through fourth aspects, process 700 includes receiving an indication of a pilot allocation size to use for one or more communications, wherein the indication of the pilot allocation size is based at least in part on the indication of the preferred pilot allocation size.

In a sixth aspect, alone or in combination with one or more of the first through fifth aspects, receiving the indication of the pilot allocation size to use for the one or more communications comprises receiving the indication of the pilot allocation size to use for the one or more communications via an indication within DCI.

In a seventh aspect, alone or in combination with one or more of the first through sixth aspects, the indication within the DCI comprises one or more of an indication of whether the preferred pilot allocation size is applied to one or more communications, or an indication of the pilot allocation size relative to the preferred pilot allocation size.

In an eighth aspect, alone or in combination with one or more of the first through seventh aspects, process 700 includes transmitting a channel state feedback report having metrics that are based at least in part on application of the preferred pilot allocation size.

In a ninth aspect, alone or in combination with one or more of the first through eighth aspects, process 700 includes transmitting an indication of support for dynamic pilot allocation sizes.

In a tenth aspect, alone or in combination with one or more of the first through ninth aspects, the frequency-domain contiguous pilots comprise phase tracking reference signals that are configured to carry data with a pilot MCS.

In an eleventh aspect, alone or in combination with one or more of the first through tenth aspects, process 700 includes receiving an indication of the pilot MCS to apply to the phase tracking reference signals.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
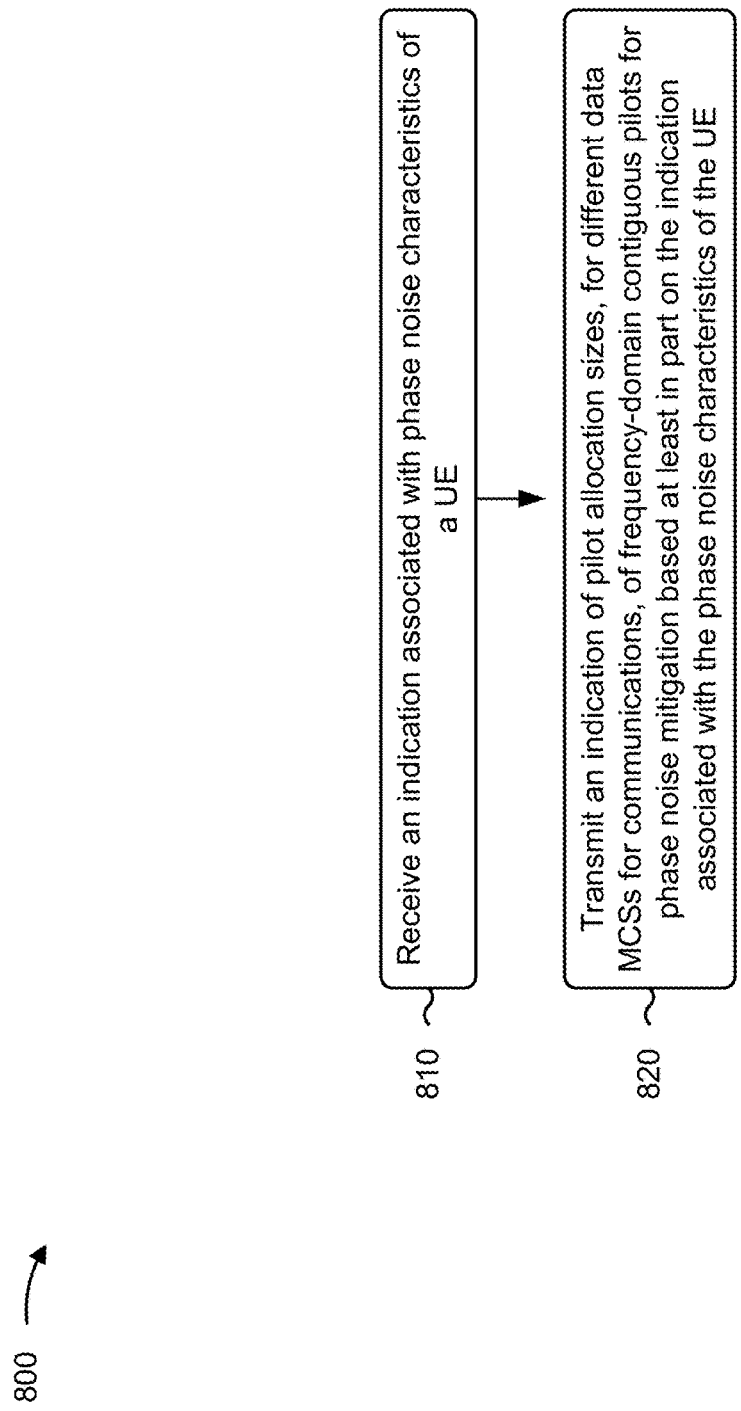

FIG. 8 is a diagram illustrating an example process 800 performed, for example, by a base station, in accordance with the present disclosure. Example process 800 is an example where the base station (e.g., base station 110) performs operations associated with phase tracking reference signal pilot allocation sizes.

As shown in FIG. 8, in some aspects, process 800 may include receiving an indication associated with phase noise characteristics of a UE (block 810). For example, the base station (e.g., using communication manager 150 and/or reception component 1102, depicted in FIG. 11) may receive an indication associated with phase noise characteristics of a UE, as described above.

As further shown in FIG. 8, in some aspects, process 800 may include transmitting an indication of pilot allocation sizes, for different data MCSs for communications, of frequency-domain contiguous pilots for phase noise mitigation based at least in part on the indication associated with the phase noise characteristics of the UE (block 820). For example, the base station (e.g., using communication manager 150 and/or transmission component 1104, depicted in FIG. 11) may transmit an indication of pilot allocation sizes, for different data MCSs for communications, of frequency-domain contiguous pilots for phase noise mitigation based at least in part on the indication associated with the phase noise characteristics of the UE, as described above.

Process 800 may include additional aspects, such as any single aspect or any combination of aspects described below and/or in connection with one or more other processes described elsewhere herein.

In a first aspect, the phase noise characteristics comprise an indication of a model used by the UE to correct phase noise.

In a second aspect, alone or in combination with the first aspect, the frequency-domain contiguous pilots for phase noise mitigation comprise phase tracking reference signals communicated over multiple adjacent frequency resources.

In a third aspect, alone or in combination with one or more of the first and second aspects, the phase tracking reference signals are configured to carry data and are configured to have a pilot MCS.

In a fourth aspect, alone or in combination with one or more of the first through third aspects, process 800 includes transmitting an indication of a maximum pilot MCS for the communications.

In a fifth aspect, alone or in combination with one or more of the first through fourth aspects, the indication of the pilot allocation sizes maps the pilot allocation sizes to one or more of different data MCSs, or different channel allocation sizes.

In a sixth aspect, alone or in combination with one or more of the first through fifth aspects, the indication of the pilot allocation sizes maps a data MCS to a pilot allocation size of zero, or wherein the indication of the pilot allocation sizes maps a channel allocation size to a pilot allocation size of zero.

In a seventh aspect, alone or in combination with one or more of the first through sixth aspects, transmitting the indication of the pilot allocation sizes comprises transmitting the indication of the pilot allocation sizes via RRC-based signaling or via one or more MAC CEs.

In an eighth aspect, alone or in combination with one or more of the first through seventh aspects, process 800 includes receiving an indication of pilot allocation size preferences based at least in part on the phase noise characteristics of the UE, wherein the indication of the pilot allocation sizes is based at least in part on the indication of pilot allocation size preferences.

In a ninth aspect, alone or in combination with one or more of the first through eighth aspects, process 800 includes transmitting an indication of a data MCS for the communications, wherein the data MCS for the communications is based at least in part on the indication of pilot allocation size preferences.

In a tenth aspect, alone or in combination with one or more of the first through ninth aspects, process 800 includes transmitting an indication of a channel allocation for the communications, wherein the allocation for the communications is based at least in part on the indication of pilot allocation size preferences.

In an eleventh aspect, alone or in combination with one or more of the first through tenth aspects, the indication of the pilot allocation sizes for the different data MCSs indicates a data MCS for which a pilot allocation size is zero.

In a twelfth aspect, alone or in combination with one or more of the first through eleventh aspects, process 800 includes receiving an indication of a capability of the UE to communicate with different pilot allocation sizes for different data MCSs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
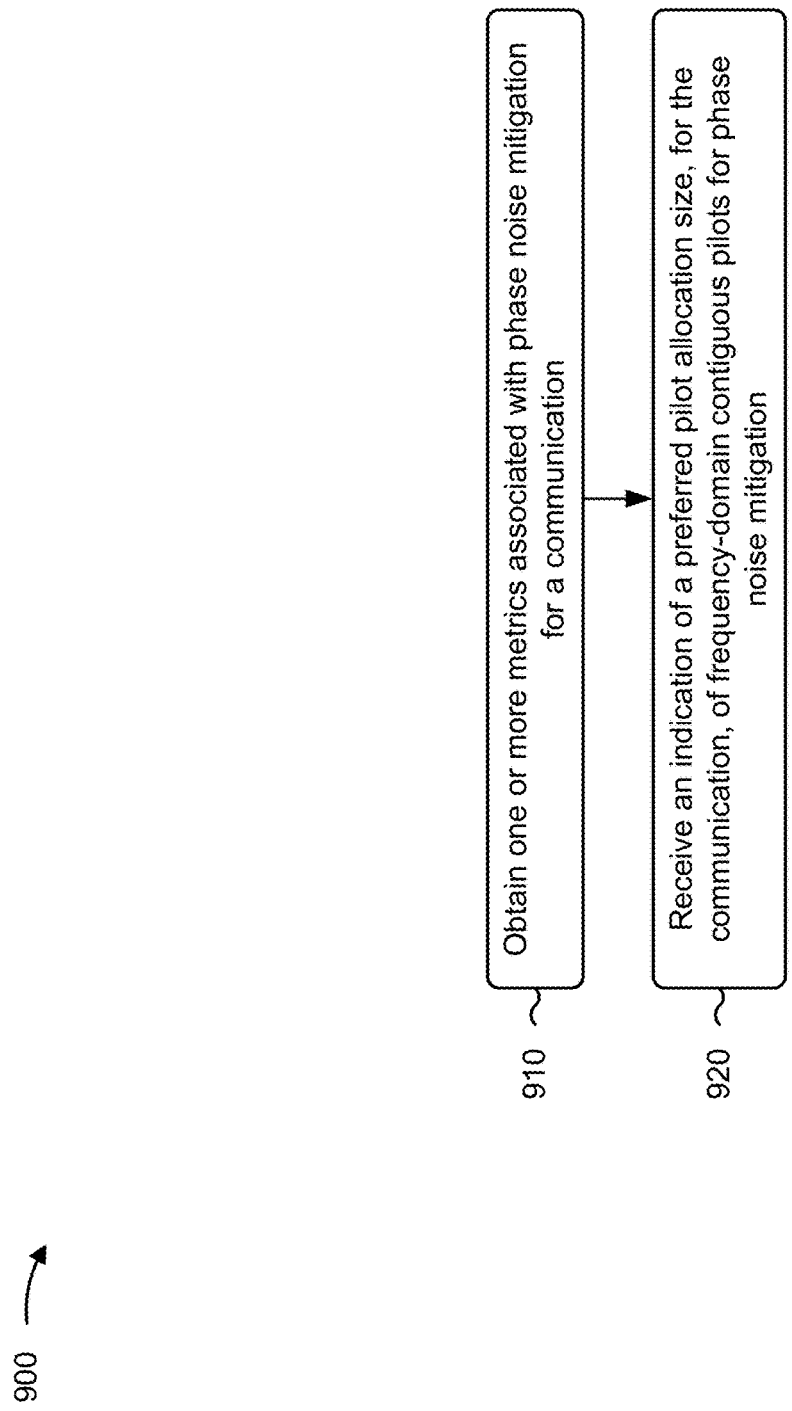

FIG. 9 is a diagram illustrating an example process 900 performed, for example, by a base station, in accordance with the present disclosure. Example process 900 is an example where the base station (e.g., base station 110) performs operations associated with phase tracking reference signal pilot allocation sizes.

As shown in FIG. 9, in some aspects, process 900 may include obtaining one or more metrics associated with phase noise mitigation for a communication (block 910). For example, the base station (e.g., using communication manager 150 and/or communication manager 1108, depicted in FIG. 11) may obtain one or more metrics associated with phase noise mitigation for a communication, as described above.

As further shown in FIG. 9, in some aspects, process 900 may include receiving an indication of a preferred pilot allocation size, for the communication, of frequency-domain contiguous pilots for phase noise mitigation (block 920). For example, the base station (e.g., using communication manager 150 and/or reception component 1102, depicted in FIG. 11) may receive an indication of a preferred pilot allocation size, for the communication, of frequency-domain contiguous pilots for phase noise mitigation, as described above.

Process 900 may include additional aspects, such as any single aspect or any combination of aspects described below and/or in connection with one or more other processes described elsewhere herein.

In a first aspect, the one or more metrics associated with the phase noise mitigation for the communication comprise one or more of a model used by the UE to correct phase noise, channeling metrics for a channel used for the communication, Doppler affects for the channel, a signal-to-interference-plus-noise ratio, or a signal-to-noise ratio.

In a second aspect, alone or in combination with the first aspect, the indication of the preferred pilot allocation size indicates a selection of the preferred pilot allocation size from a set of candidate preferred pilot allocation sizes.

In a third aspect, alone or in combination with one or more of the first and second aspects, process 900 includes transmitting an indication of the set of candidate preferred pilot allocation sizes.

In a fourth aspect, alone or in combination with one or more of the first through third aspects, process 900 includes transmitting one or more communications having frequency-domain contiguous pilots for phase noise mitigation based at least in part on the indication of the preferred pilot allocation size.

In a fifth aspect, alone or in combination with one or more of the first through fourth aspects, process 900 includes transmitting an indication of a pilot allocation size to use for one or more communications, wherein the indication of the pilot allocation size is based at least in part on the indication of the preferred pilot allocation size.

In a sixth aspect, alone or in combination with one or more of the first through fifth aspects, transmitting the indication of the pilot allocation size to use for the one or more communications comprises transmitting the indication of the pilot allocation size to use for the one or more communications via an indication within DCI.

In a seventh aspect, alone or in combination with one or more of the first through sixth aspects, the indication within the DCI comprises one or more of an indication of whether the preferred pilot allocation size is applied to one or more communications, or an indication of the pilot allocation size relative to the preferred pilot allocation size.

In an eighth aspect, alone or in combination with one or more of the first through seventh aspects, process 900 includes receiving a channel state feedback report having metrics that are based at least in part on application of the preferred pilot allocation size.

In a ninth aspect, alone or in combination with one or more of the first through eighth aspects, process 900 includes receiving an indication of support for dynamic pilot allocation sizes.

In a tenth aspect, alone or in combination with one or more of the first through ninth aspects, the frequency-domain contiguous pilots comprise phase tracking reference signals that are configured to carry data with a pilot MCS.

In an eleventh aspect, alone or in combination with one or more of the first through tenth aspects, process 900 includes transmitting an indication of the pilot MCS to apply to the phase tracking reference signals.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
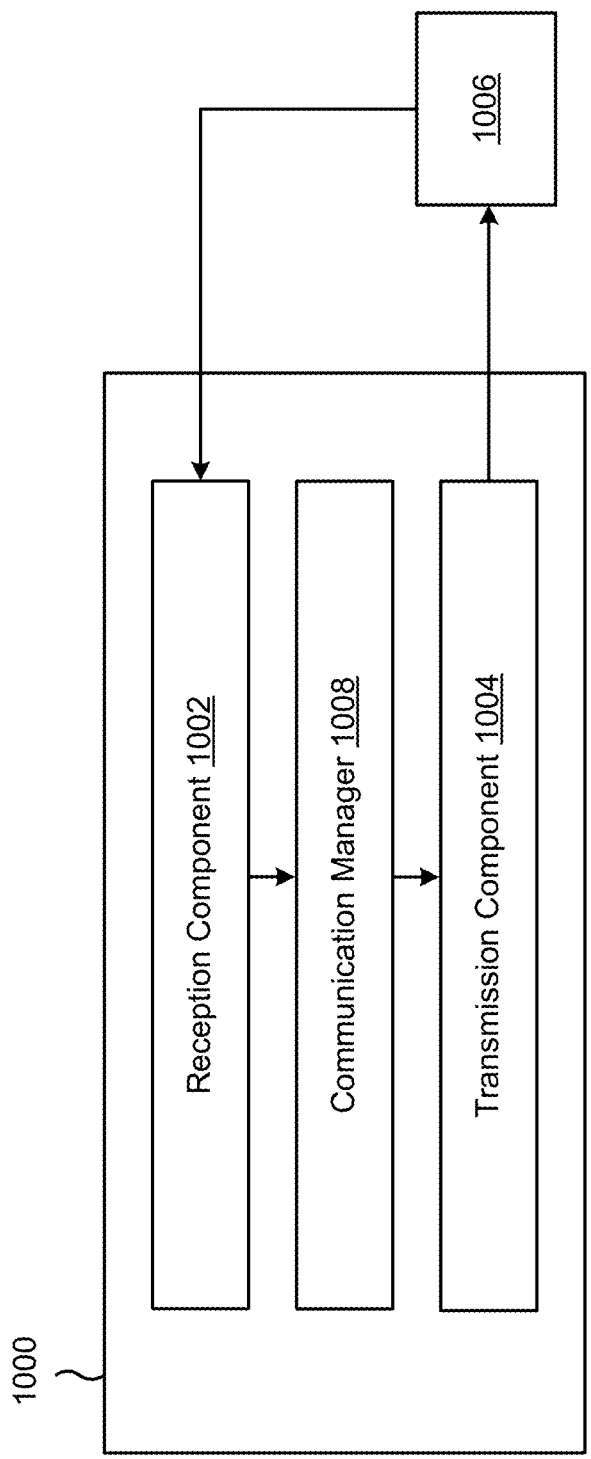
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., communication manager 140).

In some aspects, the apparatus 1000 may be configured to perform one or more operations described herein in connection with FIGS. 4-5. Additionally, or alternatively, the apparatus 1000 may be configured to perform one or more processes described herein, such as process 600 of FIG. 6, process 700 of FIG. 7, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit an indication associated with phase noise characteristics of the UE. The reception component 1002 may receive an indication of pilot allocation sizes, for different data MCSs for communications, of frequency-domain contiguous pilots for phase noise mitigation based at least in part on the indication associated with the phase noise characteristics of the UE.

The transmission component 1004 may transmit an indication of a maximum pilot MCS for the communications.

The transmission component 1004 may transmit an indication of pilot allocation size preferences based at least in part on the phase noise characteristics of the UE wherein the indication of the pilot allocation sizes is based at least in part on the indication of pilot allocation size preferences.

The reception component 1002 may receive an indication of a data MCS for the communications wherein the data MCS for the communications is based at least in part on the indication of pilot allocation size preferences.

The reception component 1002 may receive an indication of a channel allocation for the communications wherein the allocation for the communications is based at least in part on the indication of pilot allocation size preferences.

The transmission component 1004 may transmit an indication of a capability of the UE to communicate with different pilot allocation sizes for different data MCSs.

The communication manager 1008 may obtain one or more metrics associated with phase noise mitigation for a communication. The transmission component 1004 may transmit an indication of a preferred pilot allocation size, for the communication, of frequency-domain contiguous pilots for phase noise mitigation.

The reception component 1002 may receive an indication of the set of candidate preferred pilot allocation sizes.

The reception component 1002 may receive one or more communications having frequency-domain contiguous pilots for phase noise mitigation based at least in part on the indication of the preferred pilot allocation size.

The reception component 1002 may receive an indication of a pilot allocation size to use for one or more communications wherein the indication of the pilot allocation size is based at least in part on the indication of the preferred pilot allocation size.

The transmission component 1004 may transmit a channel state feedback report having metrics that are based at least in part on application of the preferred pilot allocation size.

The transmission component 1004 may transmit an indication of support for dynamic pilot allocation sizes.

The reception component 1002 may receive an indication of the pilot MCS to apply to the phase tracking reference signals.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
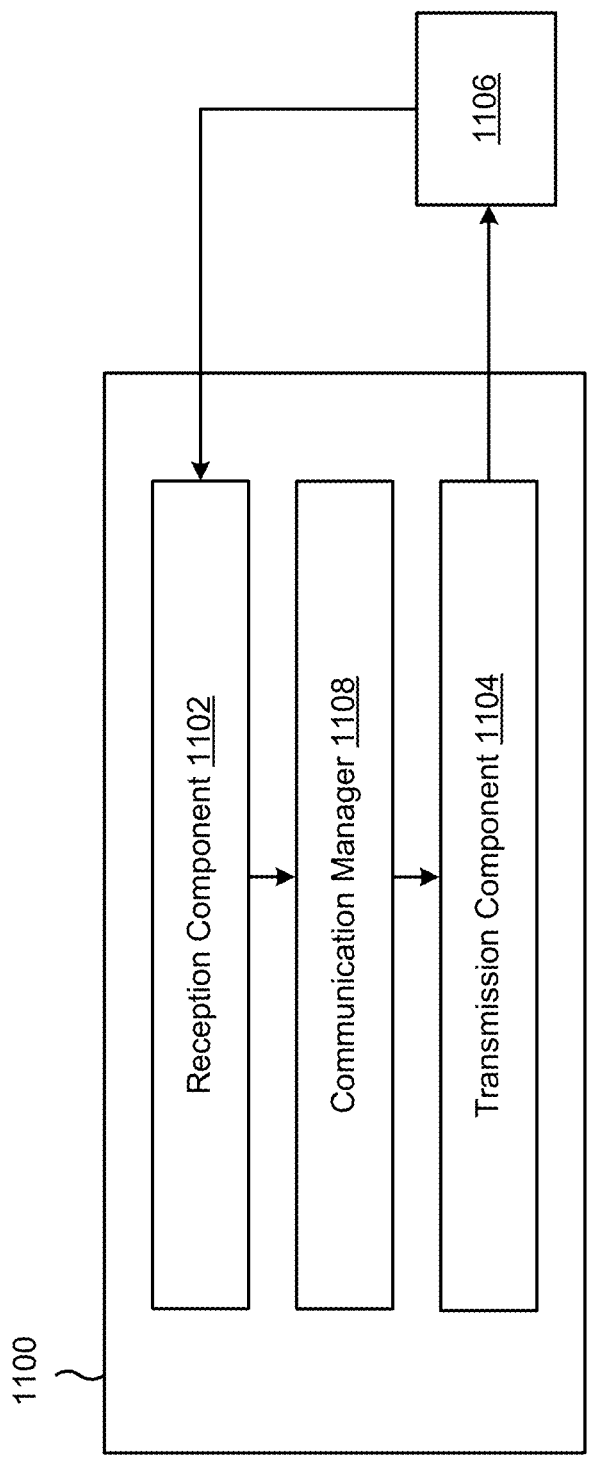

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 4-5. Additionally, or alternatively, the apparatus 1100 may be configured to perform one or more processes described herein, such as process 800 of FIG. 8 process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The reception component 1102 may receive an indication associated with phase noise characteristics of a UE. The transmission component 1104 may transmit an indication of pilot allocation sizes, for different data MCSs for communications, of frequency-domain contiguous pilots for phase noise mitigation based at least in part on the indication associated with the phase noise characteristics of the UE.

The transmission component 1104 may transmit an indication of a maximum pilot MCS for the communications.

The reception component 1102 may receive an indication of pilot allocation size preferences based at least in part on the phase noise characteristics of the UE wherein the indication of the pilot allocation sizes is based at least in part on the indication of pilot allocation size preferences.

The transmission component 1104 may transmit an indication of a data MCS for the communications wherein the data MCS for the communications is based at least in part on the indication of pilot allocation size preferences.

The transmission component 1104 may transmit an indication of a channel allocation for the communications wherein the allocation for the communications is based at least in part on the indication of pilot allocation size preferences.

The reception component 1102 may receive an indication of a capability of the UE to communicate with different pilot allocation sizes for different data MCSs.

The communication manager 1108 may obtain one or more metrics associated with phase noise mitigation for a communication. The reception component 1102 may receive an indication of a preferred pilot allocation size, for the communication, of frequency-domain contiguous pilots for phase noise mitigation.

The transmission component 1104 may transmit an indication of the set of candidate preferred pilot allocation sizes.

The transmission component 1104 may transmit one or more communications having frequency-domain contiguous pilots for phase noise mitigation based at least in part on the indication of the preferred pilot allocation size.

The transmission component 1104 may transmit an indication of a pilot allocation size to use for one or more communications wherein the indication of the pilot allocation size is based at least in part on the indication of the preferred pilot allocation size.

The reception component 1102 may receive a channel state feedback report having metrics that are based at least in part on application of the preferred pilot allocation size.

The reception component 1102 may receive an indication of support for dynamic pilot allocation sizes.

The transmission component 1104 may transmit an indication of the pilot MCS to apply to the phase tracking reference signals.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting an indication associated with phase noise characteristics of the UE; and receiving an indication of pilot allocation sizes, for different data modulation and coding schemes (MCSs) for communications, of frequency-domain contiguous pilots for phase noise mitigation based at least in part on the indication associated with the phase noise characteristics of the UE.

Aspect 2: The method of Aspect 1, wherein the phase noise characteristics comprise an indication of a model used by the UE to correct phase noise.

Aspect 3: The method of any of Aspects 1-2, wherein the frequency-domain contiguous pilots for phase noise mitigation comprise phase tracking reference signals communicated over multiple adjacent frequency resources.

Aspect 4: The method of Aspect 3, wherein the phase tracking reference signals are configured to carry data and are configured to have a pilot MCS.

Aspect 5: The method of any of Aspects 1-4, further comprising: transmitting an indication of a maximum pilot MCS for the communications.

Aspect 6: The method of any of Aspects 1-5, wherein the indication of the pilot allocation sizes maps the pilot allocation sizes to one or more of: different data MCSs, or different channel allocation sizes.

Aspect 7: The method of any of Aspects 1-6, wherein the indication of the pilot allocation sizes maps a data MCS to a pilot allocation size of zero, or wherein the indication of the pilot allocation sizes maps a channel allocation size to a pilot allocation size of zero.

Aspect 8: The method of any of Aspects 1-7, wherein receiving the indication of the pilot allocation sizes comprises: receiving the indication of the pilot allocation sizes via radio resource control-based signaling or via one or more medium access control control elements.

Aspect 9: The method of any of Aspects 1-8, further comprising: transmitting an indication of pilot allocation size preferences based at least in part on the phase noise characteristics of the UE, wherein the indication of the pilot allocation sizes is based at least in part on the indication of pilot allocation size preferences.

Aspect 10: The method of Aspect 9, further comprising: receiving an indication of a data MCS for the communications, wherein the data MCS for the communications is based at least in part on the indication of pilot allocation size preferences.

Aspect 11: The method of any of Aspects 9-10, further comprising: receiving an indication of a channel allocation for the communications, wherein the allocation for the communications is based at least in part on the indication of pilot allocation size preferences.

Aspect 12: The method of any of Aspects 1-11, wherein the indication of the pilot allocation sizes for the different data MCSs indicates a data MCS for which a pilot allocation size is zero.

Aspect 13: The method of any of Aspects 1-12, further comprising: transmitting an indication of a capability of the UE to communicate with different pilot allocation sizes for different data MCSs.

Aspect 14: A method of wireless communication performed by a user equipment (UE), comprising: obtaining one or more metrics associated with phase noise mitigation for a communication; and transmitting an indication of a preferred pilot allocation size, for the communication, of frequency-domain contiguous pilots for phase noise mitigation.

Aspect 15: The method of Aspect 14, wherein the one or more metrics associated with the phase noise mitigation for the communication comprise one or more of: a model used by the UE to correct phase noise, channel metrics for a channel used for the communication, Doppler affects for the channel, a signal-to-interference-plus-noise ratio, or a signal-to-noise ratio.

Aspect 16: The method of any of Aspects 14-15, wherein the indication of the preferred pilot allocation size indicates a selection of the preferred pilot allocation size from a set of candidate preferred pilot allocation sizes.

Aspect 17: The method of Aspect 16, further comprising: receiving an indication of the set of candidate preferred pilot allocation sizes.

Aspect 18: The method of any of Aspects 14-17, further comprising: receiving one or more communications having frequency-domain contiguous pilots for phase noise mitigation based at least in part on the indication of the preferred pilot allocation size.

Aspect 19: The method of any of Aspects 14-18, further comprising: receiving an indication of a pilot allocation size to use for one or more communications, wherein the indication of the pilot allocation size is based at least in part on the indication of the preferred pilot allocation size.

Aspect 20: The method of Aspect 19, wherein receiving the indication of the pilot allocation size to use for the one or more communications comprises: receiving the indication of the pilot allocation size to use for the one or more communications via an indication within downlink control information.

Aspect 21: The method of Aspect 20, wherein the indication within the downlink control information comprises one or more of: an indication of whether the preferred pilot allocation size is applied to one or more communications, or an indication of the pilot allocation size relative to the preferred pilot allocation size.

Aspect 22: The method of any of Aspects 14-21, further comprising: transmitting a channel state feedback report having metrics that are based at least in part on application of the preferred pilot allocation size.

Aspect 23: The method of any of Aspects 14-22, further comprising: transmitting an indication of support for dynamic pilot allocation sizes.

Aspect 24: The method of any of Aspects 14-23, wherein the frequency-domain contiguous pilots comprise phase tracking reference signals that are configured to carry data with a pilot modulation and coding scheme (MCS).

Aspect 25: The method of any of Aspects 14-24, further comprising: receiving an indication of the pilot MCS to apply to the phase tracking reference signals.

Aspect 26: A method of wireless communication performed by a base station, comprising: receiving an indication associated with phase noise characteristics of a user equipment (UE); and transmitting an indication of pilot allocation sizes, for different data modulation and coding schemes (MCSs) for communications, of frequency-domain contiguous pilots for phase noise mitigation based at least in part on the indication associated with the phase noise characteristics of the UE.

Aspect 27: The method of Aspect 26, wherein the phase noise characteristics comprise an indication of a model used by the UE to correct phase noise.

Aspect 28: The method of any of Aspects 26-27, wherein the frequency-domain contiguous pilots for phase noise mitigation comprise phase tracking reference signals communicated over multiple adjacent frequency resources.

Aspect 29: The method of Aspect 28, wherein the phase tracking reference signals are configured to carry data and are configured to have a pilot MCS.

Aspect 30: The method of Aspect 29, further comprising: transmitting an indication of a maximum pilot MCS for the communications.

Aspect 31: The method of any of Aspects 26-30, wherein the indication of the pilot allocation sizes maps the pilot allocation sizes to one or more of: different data MCSs, or different channel allocation sizes.

Aspect 32: The method of any of Aspects 26-31, wherein the indication of the pilot allocation sizes maps a data MCS to a pilot allocation size of zero, or wherein the indication of the pilot allocation sizes maps a channel allocation size to a pilot allocation size of zero.

Aspect 33: The method of any of Aspects 26-32, wherein transmitting the indication of the pilot allocation sizes comprises: transmitting the indication of the pilot allocation sizes via radio resource control-based signaling or via one or more medium access control control elements.

Aspect 34: The method of any of Aspects 26-33, further comprising: receiving an indication of pilot allocation size preferences based at least in part on the phase noise characteristics of the UE, wherein the indication of the pilot allocation sizes is based at least in part on the indication of pilot allocation size preferences.

Aspect 35: The method of Aspect 34, further comprising: transmitting an indication of a data MCS for the communications, wherein the data MCS for the communications is based at least in part on the indication of pilot allocation size preferences.

Aspect 36: The method of any of Aspects 34-35, further comprising: transmitting an indication of a channel allocation for the communications, wherein the allocation for the communications is based at least in part on the indication of pilot allocation size preferences.

Aspect 37: The method of any of Aspects 26-36, wherein the indication of the pilot allocation sizes for the different data MCSs indicates a data MCS for which a pilot allocation size is zero.

Aspect 38: The method of any of Aspects 26-37, further comprising: receiving an indication of a capability of the UE to communicate with different pilot allocation sizes for different data MCSs.

Aspect 39: A method of wireless communication performed by a base station, comprising: obtaining one or more metrics associated with phase noise mitigation for a communication; and receiving an indication of a preferred pilot allocation size, for the communication, of frequency-domain contiguous pilots for phase noise mitigation.

Aspect 40: The method of Aspect 39, wherein the one or more metrics associated with the phase noise mitigation for the communication comprise one or more of: a model used by the UE to correct phase noise, channel metrics for a channel used for the communication, Doppler affects for the channel, a signal-to-interference-plus-noise ratio, or a signal-to-noise ratio.

Aspect 41: The method of any of Aspects 39-40, wherein the indication of the preferred pilot allocation size indicates a selection of the preferred pilot allocation size from a set of candidate preferred pilot allocation sizes.

Aspect 42: The method of any of Aspects 39-41, further comprising: transmitting an indication of the set of candidate preferred pilot allocation sizes.

Aspect 43: The method of any of Aspects 39-42, further comprising: transmitting one or more communications having frequency-domain contiguous pilots for phase noise mitigation based at least in part on the indication of the preferred pilot allocation size.

Aspect 44: The method of any of Aspects 39-43, further comprising: transmitting an indication of a pilot allocation size to use for one or more communications, wherein the indication of the pilot allocation size is based at least in part on the indication of the preferred pilot allocation size.

Aspect 45: The method of Aspect 44, wherein transmitting the indication of the pilot allocation size to use for the one or more communications comprises: transmitting the indication of the pilot allocation size to use for the one or more communications via an indication within downlink control information.

Aspect 46: The method of Aspect 45, wherein the indication within the downlink control information comprises one or more of: an indication of whether the preferred pilot allocation size is applied to one or more communications, or an indication of the pilot allocation size relative to the preferred pilot allocation size.

Aspect 47: The method of any of Aspects 39-46, further comprising: receiving a channel state feedback report having metrics that are based at least in part on application of the preferred pilot allocation size.

Aspect 48: The method of any of Aspects 39-47, further comprising: receiving an indication of support for dynamic pilot allocation sizes.

Aspect 49: The method of any of Aspects 39-48, wherein the frequency-domain contiguous pilots comprise phase tracking reference signals that are configured to carry data with a pilot modulation and coding scheme (MCS).

Aspect 50: The method of Aspect 49, further comprising: transmitting an indication of the pilot MCS to apply to the phase tracking reference signals.

Aspect 51: An apparatus for wireless communication at a device, comprising a processor; memory coupled with the processor; and instructions stored in the memory and executable by the processor to cause the apparatus to perform the method of one or more of Aspects 1-50.

Aspect 52: A device for wireless communication, comprising a memory and one or more processors coupled to the memory, the one or more processors configured to perform the method of one or more of Aspects 1-50.

Aspect 53: An apparatus for wireless communication, comprising at least one means for performing the method of one or more of Aspects 1-50.

Aspect 54: A non-transitory computer-readable medium storing code for wireless communication, the code comprising instructions executable by a processor to perform the method of one or more of Aspects 1-50.

Aspect 55: A non-transitory computer-readable medium storing a set of instructions for wireless communication, the set of instructions comprising one or more instructions that, when executed by one or more processors of a device, cause the device to perform the method of one or more of Aspects 1-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        transmit an indication associated with phase noise characteristics of the UE, wherein the phase noise characteristics comprise a model used by the UE to correct phase noise; and
        receive an indication of pilot allocation sizes that maps the pilot allocation sizes to different data modulation and coding schemes (MCSs) and maps the pilot allocation sizes to different channel allocation sizes for communications, the pilot allocation sizes being of frequency-domain contiguous pilots for phase noise mitigation based at least in part on the indication associated with the phase noise characteristics of the UE.

2. The UE of claim 1, wherein the frequency-domain contiguous pilots for phase noise mitigation comprise phase tracking reference signals communicated over multiple adjacent frequency resources.

3. The UE of claim 2, wherein the phase tracking reference signals are configured to carry data and are configured to have a pilot MCS.

4. The UE of claim 3, wherein the one or more processors are further configured to:
    transmit an indication of a maximum pilot MCS for the communications.

5. The UE of claim 1, wherein the indication of the pilot allocation sizes maps a pilot allocation size of zero to a data MCS, or
    wherein the indication of the pilot allocation sizes maps a pilot allocation size of zero to a channel allocation size.

6. The UE of claim 1, wherein the one or more processors, to receive the indication of the pilot allocation sizes, are configured to:

receive the indication of the pilot allocation sizes via radio resource control-based signaling or via one or more medium access control (MAC) control elements (CEs).

7. The UE of claim 1, wherein the one or more processors are further configured to:
transmit an indication of pilot allocation size preferences based at least in part on the phase noise characteristics of the UE,
wherein the indication of the pilot allocation sizes is based at least in part on the indication of pilot allocation size preferences.

8. The UE of claim 7, wherein the one or more processors are further configured to:
receive an indication of a data MCS for the communications,
wherein the data MCS for the communications is based at least in part on the indication of pilot allocation size preferences.

9. The UE of claim 7, wherein the one or more processors are further configured to:
receive an indication of a channel allocation for the communications,
wherein the channel allocation for the communications is based at least in part on the indication of pilot allocation size preferences.

10. The UE of claim 1, wherein the indication of the pilot allocation sizes for the different data MCSs indicates a data MCS for which a pilot allocation size is zero.

11. The UE of claim 1, wherein the one or more processors are further configured to:
transmit an indication of a capability of the UE to communicate with different pilot allocation sizes for different data MCSs.

12. A user equipment (UE) for wireless communication, comprising:
a memory; and
one or more processors, coupled to the memory, configured to:
obtain one or more metrics associated with phase noise mitigation for a communication, wherein the one or more metrics comprise a model used by the UE to correct phase noise; and
transmit, in a channel state information report and based at least in part on the one or more metrics associated with phase noise mitigation, an indication of a preferred pilot allocation size that indicates a number of contiguous subchannels allocated to frequency-domain contiguous pilots, for the communication, of the frequency-domain contiguous pilots for phase noise mitigation.

13. The UE of claim 12, wherein the one or more metrics associated with the phase noise mitigation for the communication further comprise one or more of:
one or more parameters associated with components of the UE,
one or more parameters associated with channel conditions,
channel metrics for a channel used for the communication,
Doppler effects for the channel,
a signal-to-interference-plus-noise ratio, or
a signal-to-noise ratio.

14. The UE of claim 12, wherein the indication of the preferred pilot allocation size indicates a selection of the preferred pilot allocation size from a set of candidate preferred pilot allocation sizes.

15. The UE of claim 14, wherein the one or more processors are further configured to:
receive an indication of the set of candidate preferred pilot allocation sizes.

16. The UE of claim 12, wherein the one or more processors are further configured to:
receive one or more communications having frequency-domain contiguous pilots for phase noise mitigation based at least in part on the indication of the preferred pilot allocation size.

17. The UE of claim 12, wherein the one or more processors are further configured to:
receive an indication of a pilot allocation size to use for one or more communications, wherein the indication of the pilot allocation size is based at least in part on the indication of the preferred pilot allocation size.

18. The UE of claim 17, wherein the one or more processors, to receive the indication of the pilot allocation size to use for the one or more communications, are configured to:
receive the indication of the pilot allocation size to use for the one or more communications via an indication within downlink control information.

19. The UE of claim 18, wherein the indication within the downlink control information comprises one or more of:
an indication of whether the preferred pilot allocation size is applied to one or more communications, or
an indication of the pilot allocation size relative to the preferred pilot allocation size.

20. The UE of claim 12, wherein the one or more processors are further configured to:
transmit a channel state feedback report having metrics that are based at least in part on application of the preferred pilot allocation size.

21. The UE of claim 12, wherein the one or more processors are further configured to:
transmit an indication of support for dynamic pilot allocation sizes.

22. The UE of claim 12, wherein the frequency-domain contiguous pilots comprise phase tracking reference signals that are configured to carry data with a pilot modulation and coding scheme (MCS).

23. The UE of claim 22, wherein the one or more processors are further configured to:
receive an indication of the pilot MCS to apply to the phase tracking reference signals.

24. A method of wireless communication performed by a user equipment (UE), comprising:
transmitting an indication associated with phase noise characteristics of the UE, wherein the phase noise characteristics comprise a model used by the UE to correct phase noise; and
receiving an indication of pilot allocation sizes that maps the pilot allocation sizes to different data modulation and coding schemes (MCSs) and maps the pilot allocation sizes to different channel allocation sizes for communications, the pilot allocation sizes being of frequency-domain contiguous pilots for phase noise mitigation based at least in part on the indication associated with the phase noise characteristics of the UE.

25. The method of claim 24, further comprising:
transmitting an indication of a capability of the UE to communicate with different pilot allocation sizes for different data MCSs.

26. The method of claim 24, wherein the frequency-domain contiguous pilots for phase noise mitigation comprise phase tracking reference signals communicated over multiple adjacent frequency resources.

27. The method of claim 24, wherein the indication of the pilot allocation sizes maps a pilot allocation size of zero to a data MCS, or
   wherein the indication of the pilot allocation sizes maps a pilot allocation size of zero to a channel allocation size.

28. The method of claim 24, wherein receiving the indication of the pilot allocation sizes comprises:
   receiving the indication of the pilot allocation sizes via radio resource control-based signaling or via one or more medium access control (MAC) control elements (CEs).

29. A method of wireless communication performed by a user equipment (UE), comprising:
   obtaining one or more metrics associated with phase noise mitigation for a communication, wherein the one or more metrics comprise a model used by the UE to correct phase noise; and
   transmitting, in a channel state information report and based at least in part on the one or more metrics associated with phase noise mitigation, an indication of a preferred pilot allocation size that indicates a number of contiguous subchannels allocated to frequency-domain contiguous pilots, for the communication, of the frequency-domain contiguous pilots for phase noise mitigation.

30. The method of claim 29, further comprising:
   receiving an indication of a pilot allocation size to use for one or more communications, wherein the indication of the pilot allocation size is based at least in part on the indication of the preferred pilot allocation size.

\* \* \* \* \*